(12) United States Patent
Gurau et al.

(10) Patent No.: US 6,551,736 B1
(45) Date of Patent: Apr. 22, 2003

(54) FUEL CELL COLLECTOR PLATES WITH IMPROVED MASS TRANSFER CHANNELS

(75) Inventors: Vladimir Gurau, Miami, FL (US); Frano Barbir, Palm Beach Gardens, FL (US); Jay K. Neutzler, Palm Beach Gardens, FL (US)

(73) Assignee: Teledyne Energy Systems, Inc., Hunt Valley, MD (US)

( * ) Notice: Subject to any disclaimer, the term of this patent is extended or adjusted under 35 U.S.C. 154(b) by 67 days.

(21) Appl. No.: 09/702,126

(22) Filed: Oct. 30, 2000

(Under 37 CFR 1.47)

(51) Int. Cl.⁷ .............................. H01M 8/04; H01M 8/02
(52) U.S. Cl. ............................................ 429/39; 429/34
(58) Field of Search .............................. 429/30, 34, 38, 429/39

(56) References Cited

U.S. PATENT DOCUMENTS 5,376,472 A * 12/1994 Hartvigsen et al. ........... 429/32

FOREIGN PATENT DOCUMENTS

| EP | 999605 | * 5/2000 |
| JP | 06-267564 | * 9/1994 |
| JP | 8-45520 | * 2/1996 |
| WO | WO 00/17952 | * 3/2000 |

* cited by examiner

Primary Examiner—Patrick Ryan
Assistant Examiner—Jonathan Crepeau

(57) ABSTRACT

A fuel cell collector plate can be provided with one or more various channel constructions for the transport of reactants to the gas diffusion layer and the removal of water therefrom. The outlet channel can be arranged to have a reduced volume compared to the inlet channel, in both interdigitated and discontinuous spiral applications. The land width between an inlet channel and outlet channel can be reduced to improved mass flow rate in regions of deleted reactant concentrations. Additionally or alternatively, the depth of the inlet channel can be reduced in the direction of flow to reduce the diffusion path as the concentration of reactant is reduced.

8 Claims, 4 Drawing Sheets

(a)

(b)

(a)

(b)

(a)

(b)

FUEL CELL COLLECTOR PLATES WITH IMPROVED MASS TRANSFER CHANNELS

STATEMENT REGARDING FEDERALLY SPONSORED RESEARCH OR DEVELOPMENT

The United States Government has rights in this invention pursuant to Contract No. DE-FC02-97EE50476 between the United States Department of Energy and Energy Partners, L.C.

CROSS REFERENCE TO RELATED APPLICATIONS (Not Applicable)

FIELD OF THE INVENTION

This invention relates generally to fuel cells, and more particularly to collector plates for use in fuel cells.

BACKGROUND OF THE INVENTION

A fuel cell is an electro-chemical device in which chemical energy of fuel and oxygen is directly converted into electrical energy. A basic PEM fuel cell consists of a cathode and anode gas diffusion electrode formed by an electro-chemically active catalyst layer that is typically made of platinum. The cathode and anode are separated by a solid, ion conducting, polymer membrane which exists in a hydrated state. The electrodes and membrane form a membrane electrode assembly (MEA) that is enclosed between two electrically conducting, graphite collector plates. An individual fuel cell produces less than one volt at full load, requiring cells to be stacked in series to produce usable voltages. Additional, inactive cells may be added to provide cooling and reactant humidification depending upon the stack's size and application.

PEM fuel cells operate at relatively low temperatures of approximately 200 degrees Fahrenheit, and typically have efficiencies in excess of 50 percent. They can vary their output quickly to meet shifts in power demand, and are particularly well-suited for applications in which quick startup is required. In a PEM fuel cell, hydrogen-rich fuel is fed through inlet and outlet channels in a bipolar plate. The hydrogen breaks into ions and electrons at a platinum catalyzed membrane. Atmospheric oxygen enters the fuel cell from the opposite side of the membrane. Electricity is generated when the positive hydrogen ions pass through an electrolyte membrane, towards the oxygen, and reacts with the oxygen. After providing power, the electric current joins the hydrogen ions and oxygen to produce water. Water product can be trapped within the gas diffusion layer, and efficient removal is desirable.

Reactants and reaction products are transported to and from the fuel cell membrane assembly through passages formed in the collector plates. These passages, typically formed as channels, can extend continuously from inlet to outlet, referred to as open channel, and provide gases to the gas diffusion layers laterally. Alternatively, the channels can be formed discontinuously, and positioned adjacent each other, so that gas in an inlet channel is forced through the gas diffusion layer and exhausts into an outlet channel. In this discontinuous arrangement, the inlet and outlet channels can be arranged in an interdigitated relationship or in spiral series.

As gases flow in the channels, the reactants are transferred into the gas diffusion layer, and thus the concentration of reactant in the flow channels is reduced along its length of travel. This reduction in concentration can result in non-uniform reaction across the fuel cell active area.

Thus, it would solve problems of the prior art to provide collector plates having various channel designs to improve water removal and/or improve the uniformity of the flow of reactants in the gas diffusion layers.

SUMMARY OF THE INVENTION

It is an object of the invention to provide fluid passage arrangements that improve the uniformity of reactant distribution across the fuel cell.

It is a further object of the invention to provide for more uniform distribution of reactants in a fuel cell using a variety of channel geometries.

It is yet another object of the invention to improve the removal of water product from fuel cells through the collector plate channel construction.

These and other objects of the invention are provided by fuel cell collector plates having uniquely arranged channel constructions. A collector plate for use in a fuel cell system can include a generally planar collector plate body formed at least partially of conductive material and defining two opposed, substantially parallel planar surfaces surrounded along a periphery by a plate edge, in which at least one of said planar surfaces has at least one inlet channel extending from an inlet port, and at least one outlet channel extending from an outlet port, for the flow of fluids through said collector plate, with the inlet channel and said outlet channel being spaced apart on said at least one planar surface. According to an aspect of the invention, the outlet channel has an outlet channel volume and said inlet channel has an inlet channel volume; and the outlet channel volume is less than said inlet channel volume, whereby the rate at which the fluids flow to the outlet channel is increased, causing improved fluid removal.

According to another aspect of the invention, at least a portion of the cross-sectional area of the outlet channel is less than at least a portion of the cross-sectional area of the inlet channel. Various channel geometries can be provided. For example, the outlet channel volume can have a cross-sectional area having an outlet channel width, and said inlet channel volume can has a cross-sectional area having an inlet channel width, in which the outlet channel width is less than the inlet channel width. Alternatively, the outlet channel depth can be less than said inlet channel depth. Also, both the outlet channel width can be less than said inlet channel width, and the outlet channel depth less than said inlet channel depth.

According to another embodiment of the invention, the length of the outlet channel can be less than the length of the inlet channel. This geometry can be achieved, for example, by a spiral arrangement in which the inlet channel extends in a spiral adjacent to a spiral outlet channel inset at a smaller radius than the inlet channel spiral. In other words, the inlet channel and the outlet channel are arranged as spirals, said outlet channel spiral extending along a radially interior side of said inlet channel spiral, whereby the overall length of said outlet channel spiral is less than the overall length of said inlet channel spiral.

The inlet and outlet channels can also be interdigitated.

According to another aspect of the invention, collector plate channels can be constructed to include at least one inlet channel extending from an inlet port to an inlet terminus and at least one outlet channel extending from an outlet port to an outlet terminus for the flow of fluids through said collector plate, said inlet and outlet channels being spaced apart and adjacent to each other on said at least one planar surface to define a transfer zone between said inlet terminus and said outlet terminus, in which said portions of said inlet and outlet channel portions in said transfer zone define a land having a land width. The land width decreases as the fluids flow in the direction of the inlet terminus.

The decreasing land width can be achieved by a number of channel geometries. The inlet channel can increase in width towards its terminus. The outlet channel can increase in width away from its terminus. Alternatively, both can increase, resulting in a closer positioning of the inlet channel and the outlet channel in the direction of flow of the fluids.

This reduced land width permits greater mass flow rates as the concentration of reactants is decreasing. This advantage can be coupled with improved water removal by decreasing the outlet channel volume as well, by reducing the depth of the outlet channel relative to the inlet channel and/or reducing the outlet channel length relative to the inlet channel length.

Preferably, the decreasing land width in the direction of flow is utilized in an interdigitated channel configuration. The interdigitated arrangement can be linear or circular.

According to another aspect of the invention, an open channel arrangement can be constructed to reduce the diffusion path as the concentration of reactant in the flow is depleted. In such a continuous flow line, the depth of the channel can be reduced in the direction of flow so that the diffusion path is correspondingly reduced. As reactant is transferred into the diffusion layer during fuel cell operation, the concentration of reactant in the remaining flow is reduced. However, according to the invention, the depth of the channel decreases, so that the relatively lower concentration of reactant is more readily transferred into the diffusion layer. The width of the channel can also be reduced.

Thus, a number of collector plate channel arrangements can contribute to more effective water removal and more uniform distribution of reactant into the gas diffusion layer.

BRIEF DESCRIPTION OF THE DRAWINGS

A more thorough understanding of the invention can be gained from a reading of the following detailed description of embodiments of various aspects of the invention, together with a viewing of the accompanying drawings, in which.

DETAILED DESCRIPTION OF EMBODIMENTS OF THE INVENTION

The invention is directed to three primary areas for altering collector plate channel arrangements. First, aggressive flow field designs can provide a high capability of removing liquid water from outer channels of interdigitated flow patterns at low pressures. In these designs, because the mass flow rate in the outlet channel is equal to the mass flow rate in the inlet channel, decreasing outlet channel volume will increase outlet channel velocity without requiring an increase in inlet channel pressure. The increase in outlet channel velocity improves the system's ability to remove liquid water.

Figure 1:
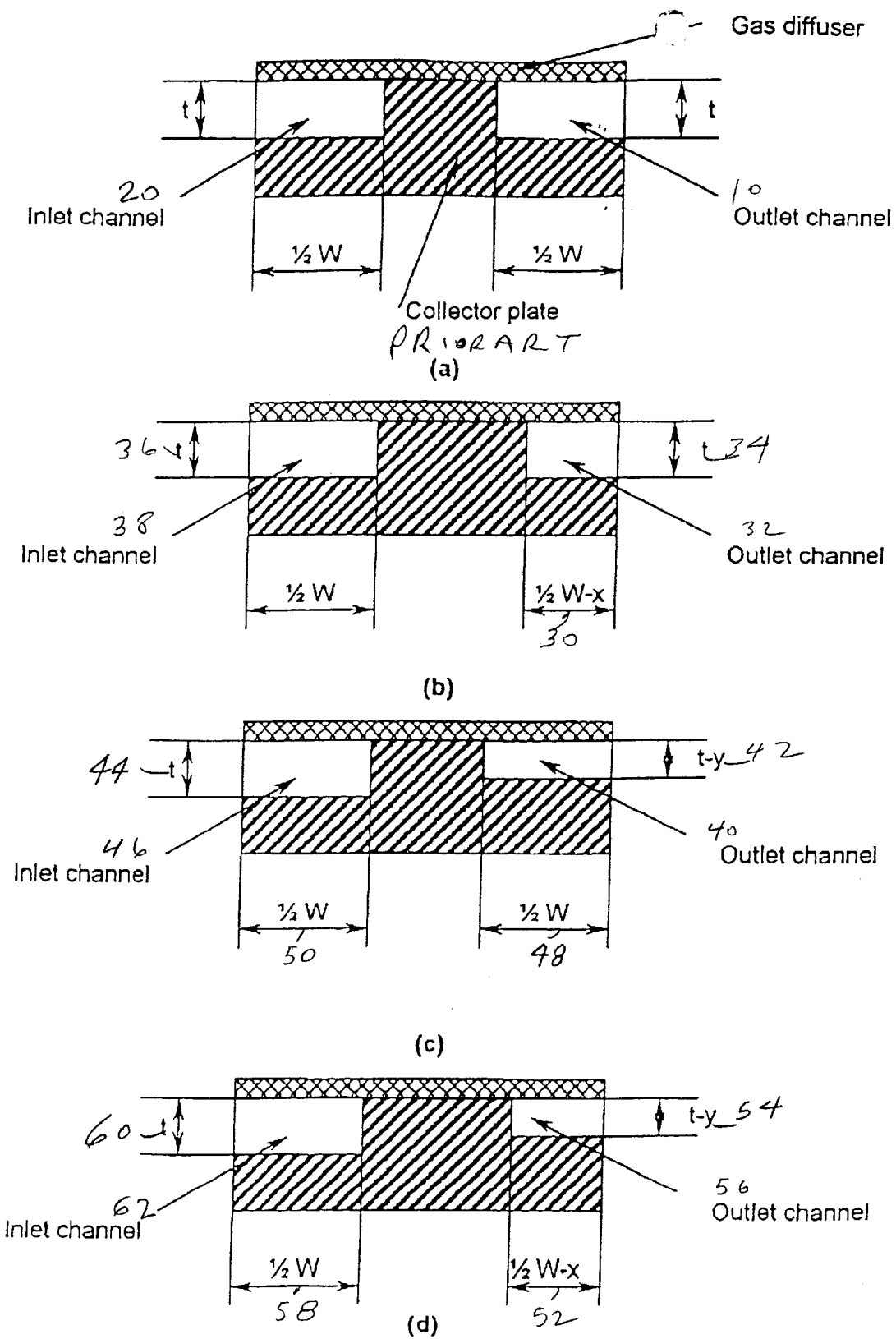
FIG. 1(a) is sectional view of a collector plate adjacent a diffusion layer, having equally sized channels according to the prior art.
FIGS. 1(b), 1(c) and 1(d) are sectional views of a collector plate adjacent a diffusion layer, having reduced outlet channel cross-sections according to the invention.

One way to employ this aggressive flow field design is to provide outlet channels that have smaller cross-sectional areas than do their corresponding inlet channels. As shown in FIG. 1(a), prior art channels have a cross-sectional area of the outlet channels 10 uniform to the inlet channels 20. According to the invention, the outlet channel volume can be reduced relative to the inlet channel volume in a number of ways. In FIG. 1(b), the channel width 30 of the outlet channel 32 can be reduced, while maintaining the same depth 34 as the depth 36 of the inlet channel 38. As shown in FIG. 1(c), the outlet channel 40 can have a depth 42 that is reduced relative to the depth 44 that of the inlet channel 46 while maintaining the same size width 48, 50. FIG. 1(d) shows another arrangement, in which both the width 52 and the depth 54 of the outlet channel 56 are reduced relative to the corresponding dimensions 58, 60 of the inlet channel 62.

These constructions can be applied to discontinuous flow fields in which the fluid flows in an inlet channel towards an inlet channel terminus and flows into a gas diffusion layer to exhaust into the outlet channel. The outlet channel can be viewed as extending from an outlet channel terminus to an outlet port. The outlet channel and the inlet channel are adjacent each other at least in a transfer zone between the respective termini. The reduced outlet channel cross-sections as described above should occur at least in the transfer zone.

Figure 2:
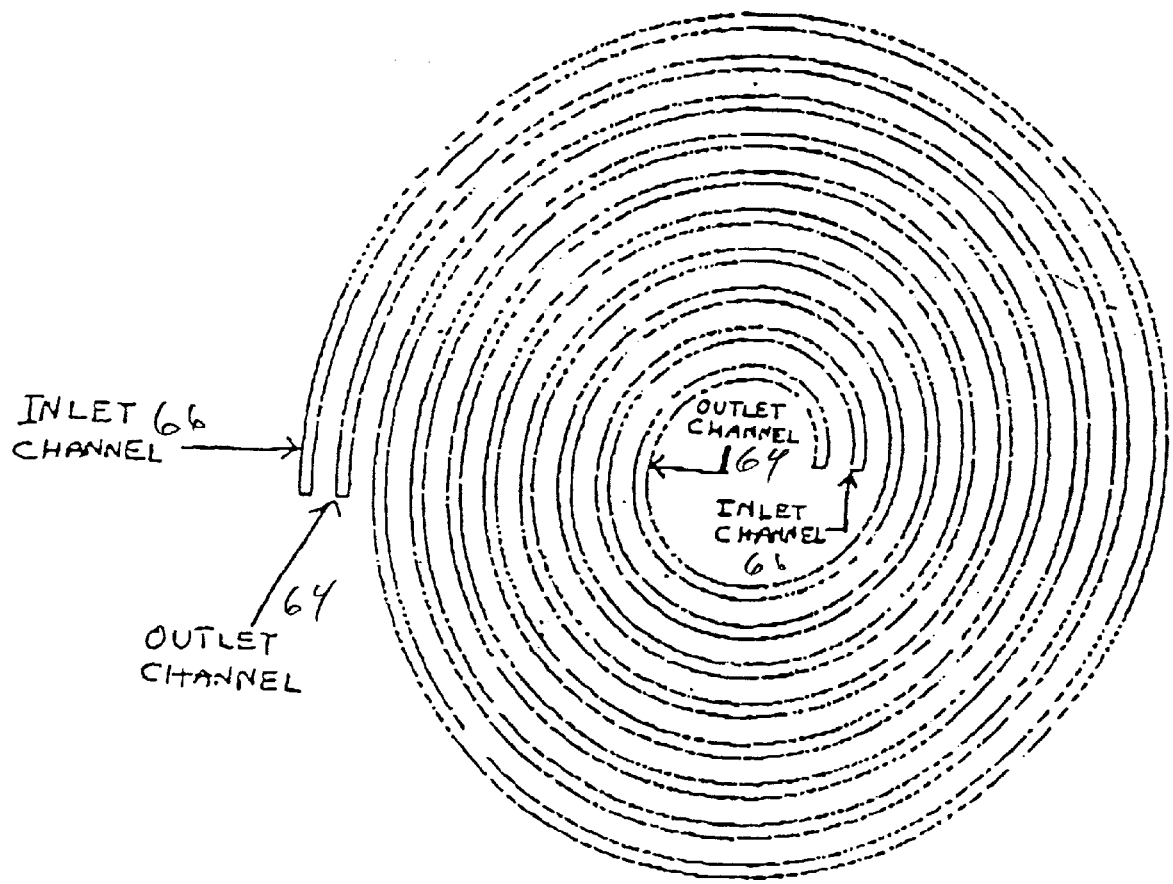
FIG. 2 is a top plan view of a collector plate channel arrangement in which the inlet and outlet channels are spaced in a spiral, interdigitated configuration.

An alternative approach would decrease the length of the outlet channel by using spiral, interdigitated flow fields. Referring to FIG. 2, the outlet channel 64 is represented by the coil that resides closer to the interior of the spiral, and the inlet channel 66 represents the coil that resides closer to the outside of the spiral. Similar to the previously described aggressive flow field designs of FIGS. 1(b)–(d), the outlet channel 64 can have a lower cross-sectional area than the inlet channel 66, and the cross-sectional area can decrease in the flow direction.

According to a second aspect of the invention, divergent/convergent interdigitated flow channels are capable of providing more reactant in the gas mixtures towards the end of the inlet channel, which is the point at which the inlet channel becomes deficient in reactant. By reducing the distance between the inlet channel and the outlet channel, this approach increases the mass flow rate of the gas mixtures towards the end of the inlet channels of an interdigitated flow pattern.

Figure 3:
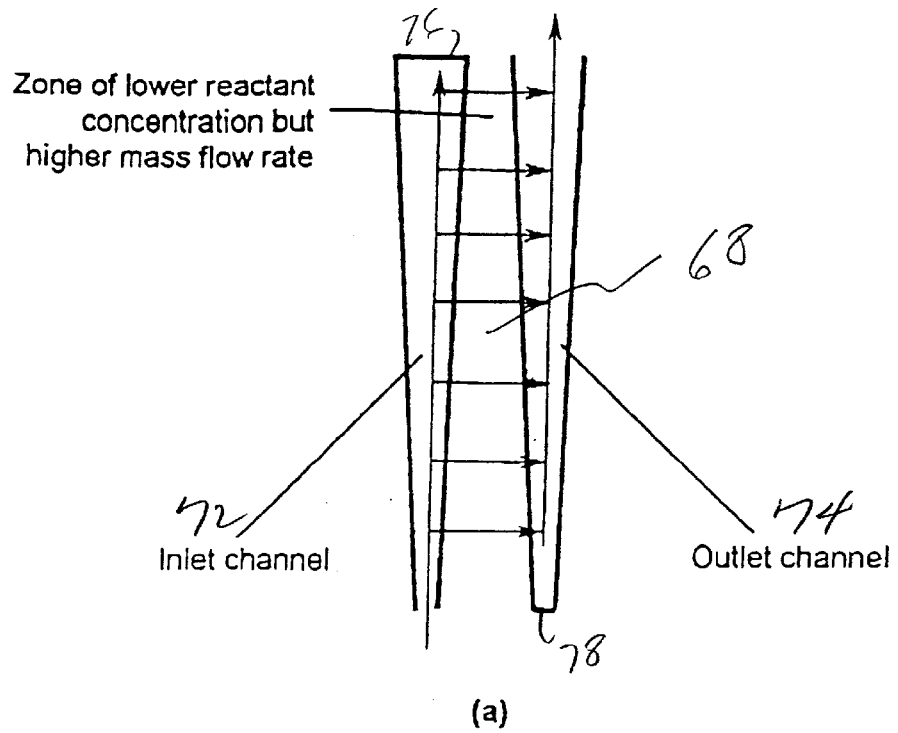
FIG. 3(a) is a top plan view of a collector plate channel arrangement applying divergent channel widths to decrease land width in an interdigitated system.
FIG. 3(b) is a top plan view of a collector plate channel arrangement applying convergent land widths between inlet and outlet channels having uniform widths.
Figure 3:
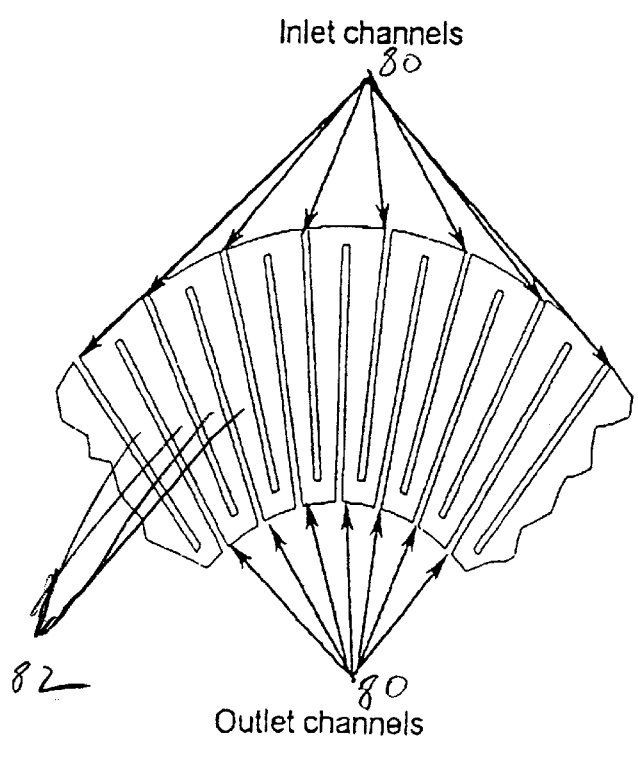

The resistance to flow through a gas diffuser is directly proportional to the distance between its inlet and outlet channels. Accordingly, a decrease in the distance between these channels will result in a increase in the rate of diffusion, which in turn causes an increase in the quantity of reactant that reaches the end of the inlet channel. FIG. 3(a) shows a divergent channel arrangement, in which the land width 68 between the inlet channel 72 and the outlet channel 74 decreases in the direction towards the inlet channel terminus 76. This decreased land width 68 can be provided by increasing the width of the inlet channel 72 toward its terminus 76 or increasing the width of the outlet channel 74 away from its terminus 78, or both, as illustrated. In this approach, the channels can have also uniform or variable depth.

FIG. 3(b) shows an alternative embodiment in which uniform channels 80 are spaced by convergent land widths 82. This arrangement results in a circular array of the interdigitated channels.

Another aspect of the invention applies to serpentine, or open channel, flow fields in which the depth of the channel 86 in a collector plate 84 decrease from the inlet port 88 to the outlet port 90. This decrease in depth in the direction of the flow 92 allows for more uniform reaction rates, by reducing the diffusion path 94 to the diffusion layer 96, as shown in FIG. 4(a).

Figure 4:
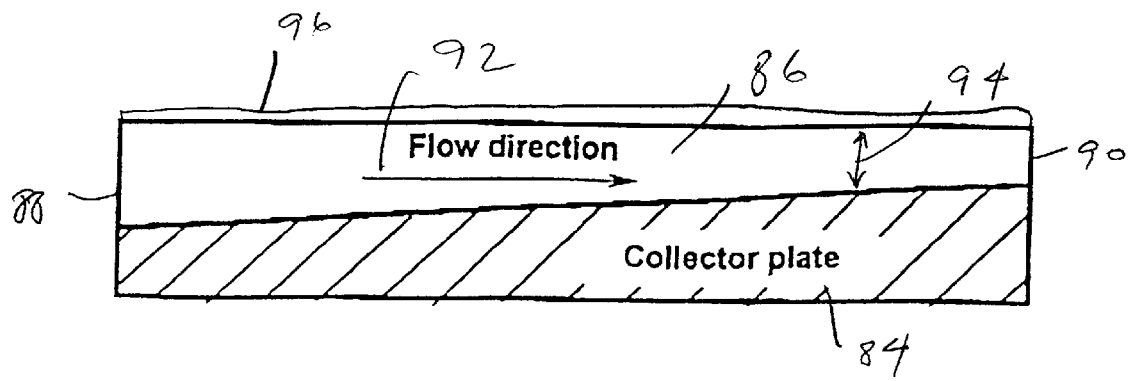
FIG. 4(a) is a side sectional view of an open channel construction having decreasing depth to improved diffusion path.
FIG. 4(b) is a side sectional view of an alternative embodiment in which the collector plate surface rises from a relatively shorter inlet channel to a relatively higher outlet channel to provide a corresponding reduction in diffusion layer thickness towards the outlet channel.
Figure 4:
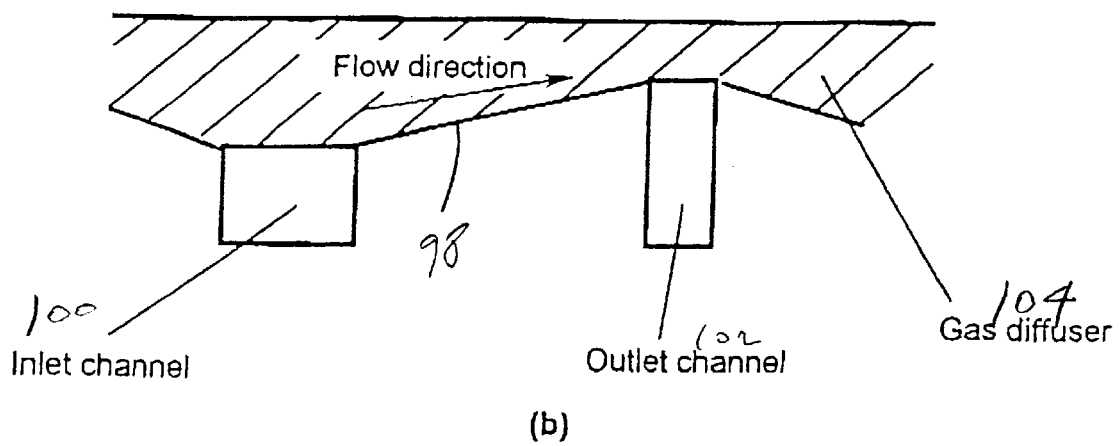

FIG. 4(b) shows as alternative arrangement for improving water removal. The collector plate surface 98 can be formed to rise from relatively shorter inlet channels 100 to relatively higher outlet channels 102. When such a collector plate placed in a fuel cell adjacent a compressed diffusion layer 104, the diffusion layer thickness is reduced toward the outlet channel 102. This constriction results in a greater concentration of flow lines and serves to increase water discharge out of the diffusion layer 102. This construction can be combined with a reduced volume outlet channel for further enhancement of water removal.

Thus, the various channel arrangements disclosed can be used to provide for improved reactant distribution and water removal, individually and in various combinations. The foregoing description of examples is intended only to illustrated and enable embodiments of the invention. The true scope of the invention should be determined by a reasoned interpretation of the following claims.

What is claimed is:

1. A collector plate for use in a fuel cell system, said fuel cell system having a first diffusion layer and a second diffusion layer disposed between two collector plates, and a membrane electrode assembly having a membrane sandwiched between two electrode layers, said membrane electrode assembly being interposed between said gas diffusion layers, said collector plate comprising:

a generally planar collector plate body formed at least partially of conductive material and defining two opposed, substantially parallel planar surfaces surrounded along a periphery by a plate edge, said collector plate body having a plurality of inlet channels and a plurality of outlet channels arranged adjacent each other in an interdigitated manner, a distance between any of said inlet channels adjacent any of said outlet channels decreasing toward a terminus of said inlet channel.

2. The collector plate according to claim 1, wherein:

at least one of said planar surfaces has at least one of said plurality of inlet channels extending from an inlet port to an inlet terminus and at least one of said plurality of outlet channels extending from an outlet port to an outlet terminus, said inlet and outlet channels being spaced apart and adjacent to each other on said at least one planar surface to define a transfer zone between said inlet terminus and said outlet terminus, portions of said inlet and outlet channel in said transfer zone defining a land having a land width; said land width decreasing in a direction towards said inlet terminus;

said at least one outlet channel in said transfer zone having an outlet channel volume which includes an outlet channel length, and a cross-sectional area having an outlet channel width and an outlet channel depth;

said at least one inlet channel in said transfer zone having an inlet channel volume which includes an inlet channel length, and a cross-sectional area having an inlet channel width and an inlet channel depth; and said cross-sectional area of said outlet channel varies along said length of said outlet channel in said transfer zone.

3. The collector plate according to claim 2, wherein said outlet channel width varies along said length of said at least one outlet channel in said transfer zone.

4. The collector plate according to claim 2, wherein said outlet channel depth varies along said length of said at least one outlet channel in said transfer zone.

5. The collector plate according to claim 2, wherein:

said outlet channel volume has a cross-sectional area and said inlet channel volume has a cross-sectional area; and said cross-sectional area of said inlet channel varies along said length of said at least one inlet channel.

6. The collector plate according to claim 5, wherein said inlet channel width varies along said length of said at least one inlet channel.

7. The collector plate according to claim 6, wherein said inlet channel depth varies along said length of said at least one inlet channel.

8. The collector plate according to claim 1, wherein:

at least one of said plurality of outlet channels has an outlet channel volume which includes an outlet channel length, and a cross-sectional area having an outlet channel width and an outlet channel depth;

at least one of said plurality of inlet channels has an inlet channel volume which includes an inlet channel length, and a cross-sectional area having an inlet channel width and an inlet channel depth; and said cross-sectional area of said outlet channel varies along said length of said outlet channel, and said cross-sectional area of said inlet channel varies along said length of said inlet channel.

\* \* \* \* \*